US 8,244,664 B2

(12) United States Patent
Ghosh et al.

(10) Patent No.: US 8,244,664 B2
(45) Date of Patent: Aug. 14, 2012

(54) ESTIMATING INFLUENCE OF SUBJECTS BASED ON A SUBJECT GRAPH

(75) Inventors: Rishab Aiyer Ghosh, Brussels (BE); Vipul Ved Prakash, San Francisco, CA (US)

(73) Assignee: Topsy Labs, Inc., San Francisco, CA (US)

( * ) Notice: Subject to any disclaimer, the term of this patent is extended or adjusted under 35 U.S.C. 154(b) by 391 days.

(21) Appl. No.: 12/628,801

(22) Filed: Dec. 1, 2009

(65) Prior Publication Data

US 2010/0153329 A1      Jun. 17, 2010

Related U.S. Application Data

(60) Provisional application No. 61/200,638, filed on Dec. 1, 2008.

(51) Int. Cl.
*G06F 17/00* (2006.01)
*G06N 7/04* (2006.01)

(52) U.S. Cl. .......................................................... 706/54
(58) Field of Classification Search ........................ None
See application file for complete search history.

(56) References Cited

U.S. PATENT DOCUMENTS

| | | | |
|---|---|---|---|
| 6,151,585 A | 11/2000 | Altschuler et al. | |
| 6,286,005 B1 | 9/2001 | Cannon | |
| 7,512,612 B1 | 3/2009 | Akella et al. | |
| 2003/0110056 A1 | 6/2003 | Berghofer et al. | |
| 2003/0229531 A1 | 12/2003 | Heckerman et al. | |
| 2004/0225592 A1 | 11/2004 | Churquina | |
| 2005/0256866 A1 | 11/2005 | Lu et al. | |
| 2006/0041543 A1 | 2/2006 | Achlioptas | |
| 2006/0059055 A1 | 3/2006 | Lin | |
| 2006/0074836 A1 | 4/2006 | Gardner et al. | |
| 2006/0218577 A1 | 9/2006 | Goodman et al. | |
| 2006/0294134 A1 | 12/2006 | Berkhim et al. | |
| 2007/0027744 A1 | 2/2007 | Carson et al. | |
| 2007/0078699 A1 | 4/2007 | Scott et al. | |
| 2007/0121843 A1 | 5/2007 | Atazky et al. | |

(Continued)

FOREIGN PATENT DOCUMENTS

WO   WO2006/116516 A2   11/2006

(Continued)

OTHER PUBLICATIONS

'Co-authorship networks in the digital library research community': Liu, 2005, Elsevier, Information Processing and Management 41 (2005) pp. 1462-1480.*

(Continued)

*Primary Examiner* — Omar Fernandez Rivas
*Assistant Examiner* — Peter Coughlan
(74) *Attorney, Agent, or Firm* — Paul Davis; Goodwin Procter LLP (57) ABSTRACT

Estimating influence includes receiving a subject graph, in which the subject graph includes two or more subject nodes, in which each subject node corresponds to a subject; and determining an objective influence measure for each first subject node of the subject graph, in which the determination is based at least on part on a function of inward scores and outward scores, in which inward scores are computed from one or more paths leading to the first subject of a length of at least one, and outward scores are computed from one or more paths leading from the first subject of a length of at least one.

24 Claims, 7 Drawing Sheets

U.S. PATENT DOCUMENTS

| | | |
|---|---|---|
| 2007/0156636 A1 | 7/2007 | Norton et al. |
| 2007/0168533 A1 | 7/2007 | Canright et al. |
| 2007/0219863 A1 | 9/2007 | Park et al. |
| 2007/0297405 A1 | 12/2007 | He |
| 2008/0104225 A1 | 5/2008 | Zhang et al. |
| 2008/0133426 A1 | 6/2008 | Porat et al. |
| 2008/0288305 A1 | 11/2008 | LaLuzerne et al. |
| 2008/0288596 A1 | 11/2008 | Smith et al. |
| 2009/0119173 A1 | 5/2009 | Parsons et al. |
| 2009/0234828 A1 | 9/2009 | Tu |

FOREIGN PATENT DOCUMENTS

| | | |
|---|---|---|
| WO | WO2008/006059 A2 | 1/2008 |

OTHER PUBLICATIONS

Page L. et al: 'The pagerank citation ranking: Bringing order to the web', Internet Citation; Jan. 29, 1998 XP002213518.*

'Towards an objective assessment of centrality measures in reputation systems': von der Weth, 2007, IEEE, 0-7695-2913.*

Powertrust: A robust and scalable reputation system for trusted peer-to-peer computing': Zhou, 2007, IEEE, 1-45-921907.*

Guha, R., Kumar, R., Raghavan, P., and Tomkins, A. 2004. Propagation of trust and distrust. In Proceedings of the 13th International Conference on World Wide Web (New York, NY, USA, May 17-20, 2004). WWW '04. ACM, New York, NY, pp. 403-412.

Ziegler, C. and Lausen, G. 2005. Propagation Models for Trust and Distrust in Social Networks Information Systems Frontiers 7, 4-5 (Dec. 2005), 337-358.

Tao, Yufei et al: "Selectivity Estimation of Predictive Spatio-Temporal Queries", Proceedings 19th International Conference on Data Engineering (ICDE'2003). Bangladore, India, Mar. 5-8, 2003; pp. 417-428.

Dai, Na et al: "Mining Anchor Text Trends for Retrieval" Mar. 28, 2010; pp. 127-139.

Ashkan, Azin et al: "Classifying and Characterizing Query Intent", Apr. 6, 2009, pp. 578-586.

Garfield, E.: "Citation Analysis as a Tool in Journal Evaluation", 1972, pp. 527-544, XP002381248.

Johnson, Caleb: "Likebutton.me Reveals What Your Friends 'Like' Across the Web"; Apr. 26, 2010, pp. 1-7; XP000002656471.

Anonymous: "H-index", Wikipedia, Internet Article, Jun. 10, 2010; pp. 1-3; XP000002656472.

Dietz, Laura et al: "Unsupervised Prediction of Citation Influences", Proceedings of the 24th International Conference on Machine Learning, Jun. 20, 2007; pp. 233-240; XP55004362.

Huang, Jeff et al: "Conversational Tagging in Twitter", Proceedings of the 21st ACM Conference on Hypertext and Hypermedia; Jun. 13, 2010; p. 173; XP55004356.

Page, L. et al: "The PageRank Citation Ranking: Bringing Order to the Web", Internet Citation; Jan. 29, 1998; XP002213518.

Massa, Paolo et al: "Using Trust in Recommender Systems: An Experimental Analysis"; Feb. 26, 2004; pp. 221-235, section 1.1; pp. 222-223, sections 1.3 and 2; pp. 225-227.

* cited by examiner

ESTIMATING INFLUENCE OF SUBJECTS BASED ON A SUBJECT GRAPH

CROSS REFERENCE TO OTHER APPLICATIONS

This application claims priority to U.S. Provisional Patent Application No. 61/200,638 entitled SYSTEM AND METHOD OF ESTIMATING INFLUENCE filed Dec. 1, 2008, which is incorporated herein by reference for all purposes.

BACKGROUND OF THE INVENTION

Knowledge is increasingly more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities. Although there are various tools (e.g., search engines, community boards with various ratings), there lacks any indicia of personal trustworthiness (e.g., measure of the source's reputation and/or influence) with located data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Currently, a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, blogs, and other sources to locate (sometimes rated) data about a particular topic/subject (e.g., where to stay when visiting San Francisco). Such an approach is time consuming and often unreliable as with most of the electronic data there lacks an indicia of trustworthiness of the source of the information. Failing to find a plethora (or spot on) information from immediate non-electronic and/or electronic data source(s), the person making the inquiry is left to make the decision using limited information, which can lead to less than perfect predictions of outcomes, results, and can lead to low levels of satisfaction undertaking one or more activities for which information was sought.

Current practices also do not leverage trustworthiness of information or, stated differently, attribute a value to the reputation of the source of data (e.g., referral). With current practices, the entity seeking the data must make a value judgment on the reputation of the data source. Such value judgment is generally based on previous experiences with the data source (e.g., rely on Mike's restaurant recommendations as he is a chef and Laura's hotel recommendations in Europe as she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such a prospect often leads certain participants from not engaging in a contemplated activity.

Reputation accrued by persons in such a network of references is subjective. In other words, reputation accrued by persons in such a network of references appear differently to each other person in the network, as each person's opinion is formed by their own individual networks of trust.

Real world trust networks follow a small-world pattern, that is, where everyone is not connected to everyone else directly, but most people are connected to most other people through a relatively small number of intermediaries or "connectors". Accordingly, this means that some individuals within the network may disproportionately influence the opinion held by other individuals. In other words, some people's opinions may be more influential than other people's opinions.

In some embodiments, influence is provided for augmenting reputation, which may be subjective. In some embodiments, influence can be an objective measure. For example, influence can be useful in filtering opinions, information, and data.

From the foregoing, it will be appreciated that there exists a need for systems and methods that are aimed to ameliorate the shortcomings of existing practices.

Accordingly, estimating influence is provided. For example, estimating influence includes determining an objective influence measure, which can be applied to various applications (e.g., search using objective influence) is provided. In some embodiments, estimating influence includes receiving a subject graph, in which the subject graph includes two or more subject nodes, in which each subject node corresponds to a subject; in which the subject graph is a directed graph, or if the subject graph is an undirected graph, then each undirected edge is interpreted as two directed edges in opposite directions; and determining an objective influence measure based on the subject graph for each first subject node of the subject graph, in which the determination is based at least on part on a function of inward scores and outward scores, in which inward scores are based on a count (e.g., and weights) of one or more paths leading to the first subject of a length of at least one, and outward scores are based on a count (e.g., and weights) of one or more paths leading from the first subject of a length of at least one, in which a path is a sequence of contiguous edges with a length equal to its number of edges, in which at least one of the inward paths or outward paths is of length greater than one.

In some embodiments, subjects correspond to one or more of the following: representations of a person, web log, and entities representing Internet authors or users of social media services including one or more of the following: blogs, Twitter, or reviews on Internet web sites. In some embodiments, objects correspond to one or more of the following: books, films, music, documents, websites, objects for sale, objects that are reviewed or recommended or cited, or any entities that are or may be associated with a Uniform Resource Identifier (URI).

In some embodiments, systems and methods are provided allowing for the attribution of influence to data sources (e.g., sources of opinions, data, or referrals). In some embodiments, scores (e.g., influence scores) are determined for each entity within a network on a given dimension. In some embodiments, an entity is directly linked to any number of other entities on any number of dimensions, with each link possibly having an associated score. For example, a path on a given dimension between two entities, such as a source and a target, includes a directed or an undirected link from the source entity to an intermediate entity, prefixed to a directed or undirected path from the intermediate entity to the target entity in the same or possibly a different dimension.

In some embodiments, each entity with undirected or inward directed links from other entities is provided with a measure of influence on any dimension that indicates the relevant importance of such entities in parts between other entities.

Figure 1:
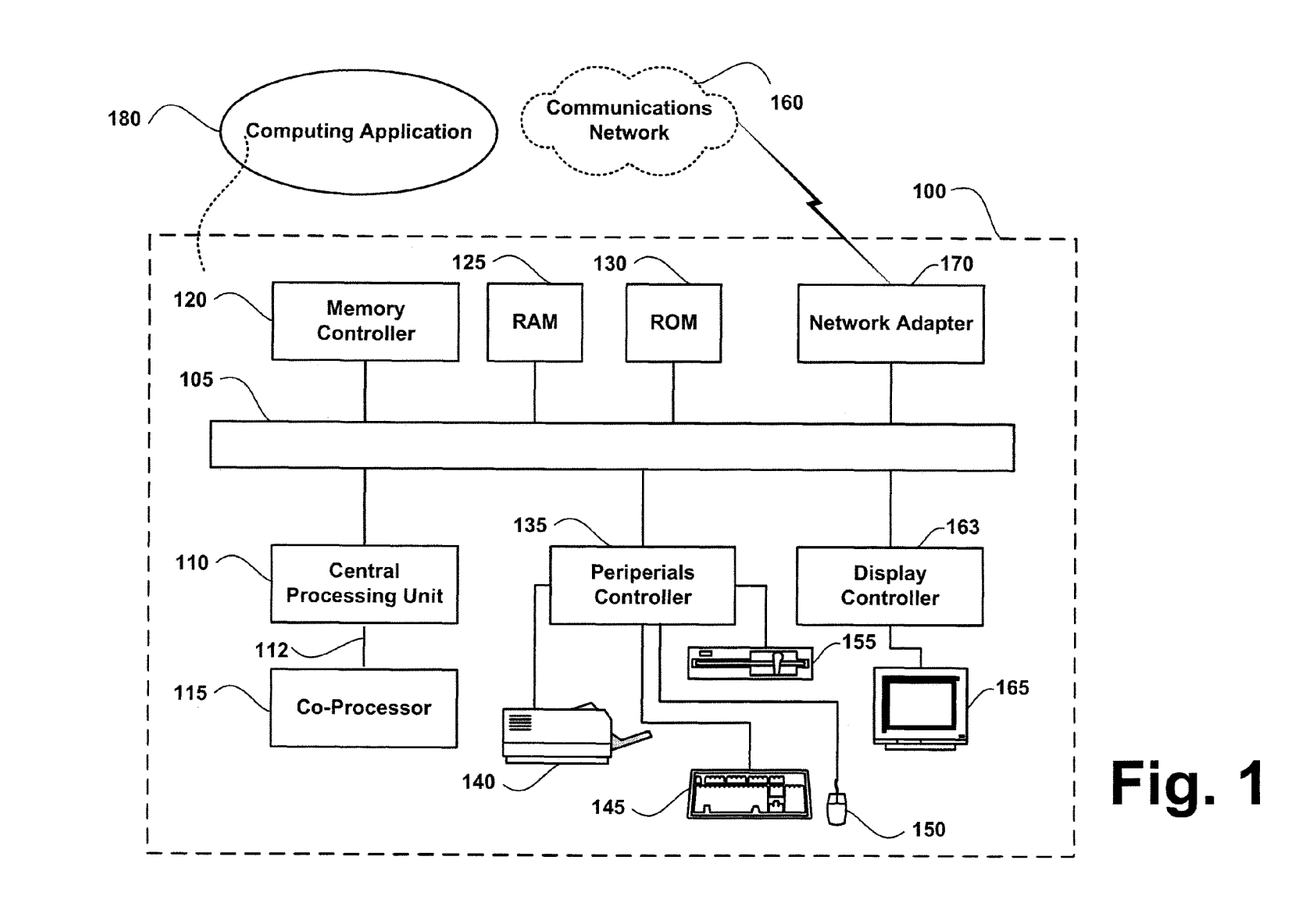
FIG. 1 is a block diagram of an exemplary computing environment in accordance with some embodiments.

FIG. 1 is a block diagram of an exemplary computing environment in accordance with some embodiments. In particular, FIG. 1 depicts an exemplary computing system 100 in accordance with some embodiments. The computing system 100 is capable of executing a variety of computing applications 180. For example, computing application 180 can include a computing application, a computing applet, a computing program, and/or other instruction set operative on computing system 100 to perform at least one function, operation, and/or procedure. In some embodiments, exemplary computing system 100 is controlled primarily by computer readable instructions, which, for example, can be in the form of software. The computer readable instructions can include instructions for computing system 100 for storing and accessing the computer readable instructions themselves. For example, such software can be executed within central processing unit (CPU) 110 to cause the computing system 100 to do work. In many known computer servers, workstations, and personal computers, CPU 110 is implemented by micro-electronic chips CPUs called microprocessors. A coprocessor 115 is an optional processor, distinct from the main CPU 110 that performs additional functions or assists the CPU 110. As shown, the CPU 110 is connected to co-processor 115 through interconnect 112. For example, one common type of coprocessor is the floating-point coprocessor, also called a numeric or math coprocessor, which is designed to perform numeric calculations faster and better than the general-purpose CPU 110.

In operation, the CPU 110 fetches, decodes, and executes instructions, and transfers information to and from other resources via the computer's main data-transfer path, system bus 105. Such a system bus connects the components in the computing system 100 and defines the medium for data exchange. Memory devices coupled to the system bus 105 include random access memory (RAM) 125 and read only memory (ROM) 130. Such memories include circuitry that allows information to be stored and retrieved. The ROM 130 generally includes stored data that cannot be modified. Data stored in the RAM 125 can be read or changed by CPU 110 or other hardware devices. Access to the RAM 125 and/or ROM 130 can be controlled by memory controller 120. For example, the memory controller 120 can provide an address translation function that translates virtual addresses into physical addresses as instructions are executed.

In addition, the computing system 100 includes peripherals controller 135 responsible for communicating instructions from the CPU 110 to peripherals, such as, printer 140, keyboard 145, mouse 150, and data storage drive 155. Display 165, which is controlled by a display controller 163, is used to display visual output generated by the computing system 100. For example, such visual output can include text, graphics, animated graphics, and video. The display controller 163 includes electronic components required to generate a video signal that is sent to display 165. Further, the computing system 100 can include network adaptor 170, which can be used to connect the computing system 100 to an external communication network 160.

Computing system 100, described above, can be deployed as part of a computer network in accordance with some embodiments. In general, the above description for computing environments applies to both server computers and client computers deployed in a network environment.

Figure 2:
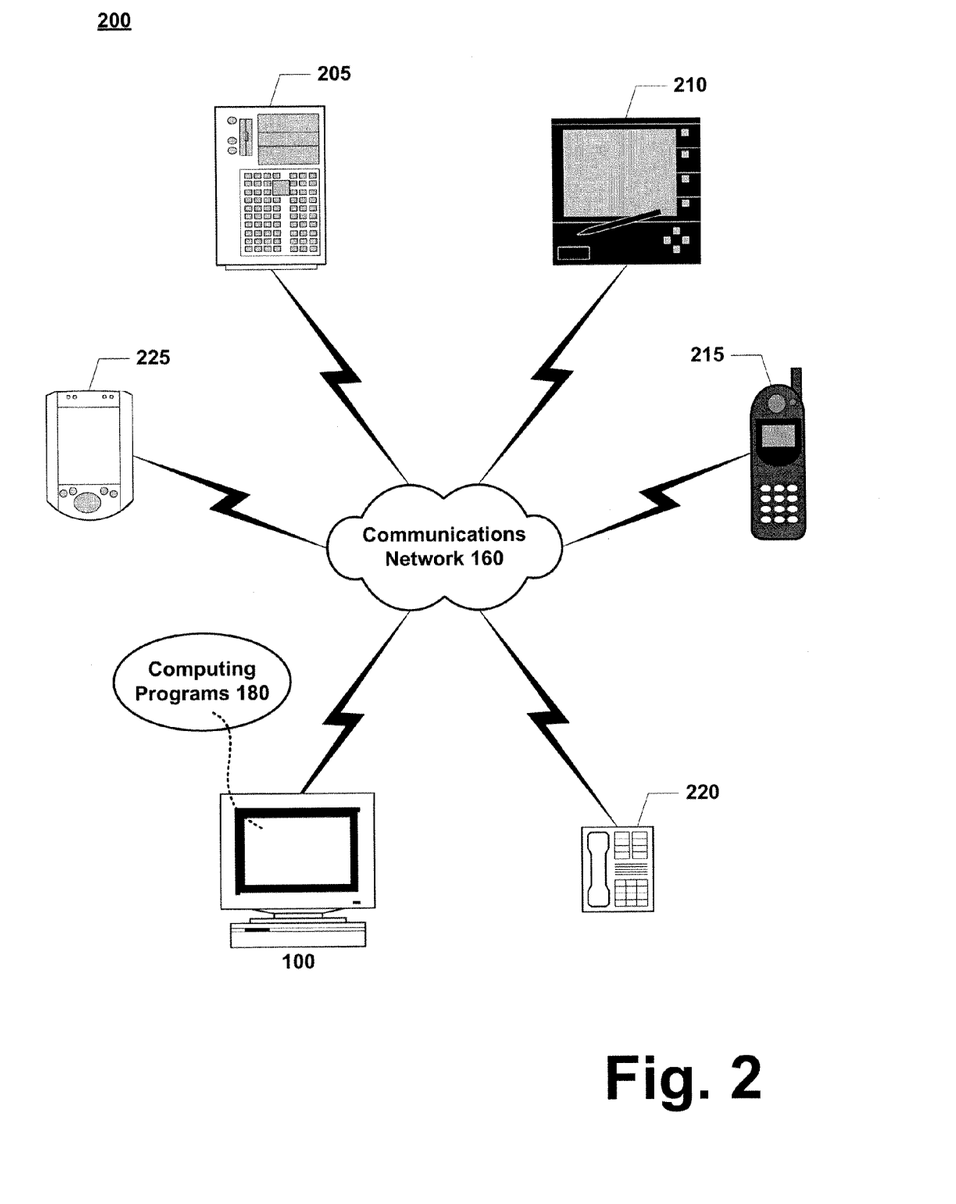
FIG. 2 is a block diagram showing the cooperation of exemplary components of an illustrative implementation in accordance with some embodiments.

FIG. 2 is a block diagram showing the cooperation of exemplary components of an illustrative implementation in accordance with some embodiments. In particular, FIG. 2 illustrates an exemplary illustrative networked computing environment 200 including a server in communication with client computers via a communications network, in which the herein described techniques can be employed. As shown in FIG. 2, server 205 is interconnected via a communications network 160 (e.g., which can be either of, or a combination of a fixed-wire or wireless LAN, WAN, intranet, extranet, peer-to-peer network, virtual private network, the Internet, or other communications network) with a number of client computing environments, which illustratively include tablet personal computer 210, mobile telephone 215, telephone 220, personal computer 100, and personal digital assistant (PDA) 225 (e.g., as will be apparent to one of ordinary skill, other client computing environments can also be provided in communication with communications network 160, such as, for example, a gaming console (not shown) and/or a personal media device (e.g., IPOD®) (not shown)). In a network environment in which the communications network 160 is the Internet, for example, server 205 can be dedicated computing environment servers operable to process and communicate data to and from client computing environments 100, 210, 215, 220, and 225 via any of a number of known protocols, such as, hypertext transfer protocol (HTTP), file transfer protocol (FTP), simple object access protocol (SOAP), or wireless application protocol (WAP). Additionally, networked computing environment 200 can utilize various data security protocols such as secured socket layer (SSL) or pretty good privacy (PGP). Each client computing environment 100, 210, 215, 220, and 225 can be equipped with operating system 180 operable to support one or more computing applications, such as a web browser (not shown), or other graphical user interface (not shown), or a mobile desktop environment (not shown) to gain access to server computing environment 205.

In some embodiments, in operation, a user (not shown) interacts with a computing application running on a client computing environments to obtain desired data and/or computing applications. For example, the data and/or computing applications can be stored on server computing environment 205 and communicated to cooperating users through client computing environments 100, 210, 215, 220, and 225, over exemplary communications network 160. A participating user can request access to specific data and applications housed in whole or in part on server computing environment 205. The data can be communicated between client computing environments 100, 210, 215, 220, and 220 and server computing environments for processing and storage. Server computing environment 205 can host computing applications, processes and applets for the generation, authentication, encryption, and communication data and applications and can cooperate with other server computing environments (not shown), third party service providers (not shown), network attached storage (NAS) and storage area networks (SAN) to realize application/data transactions.

Figure 3:
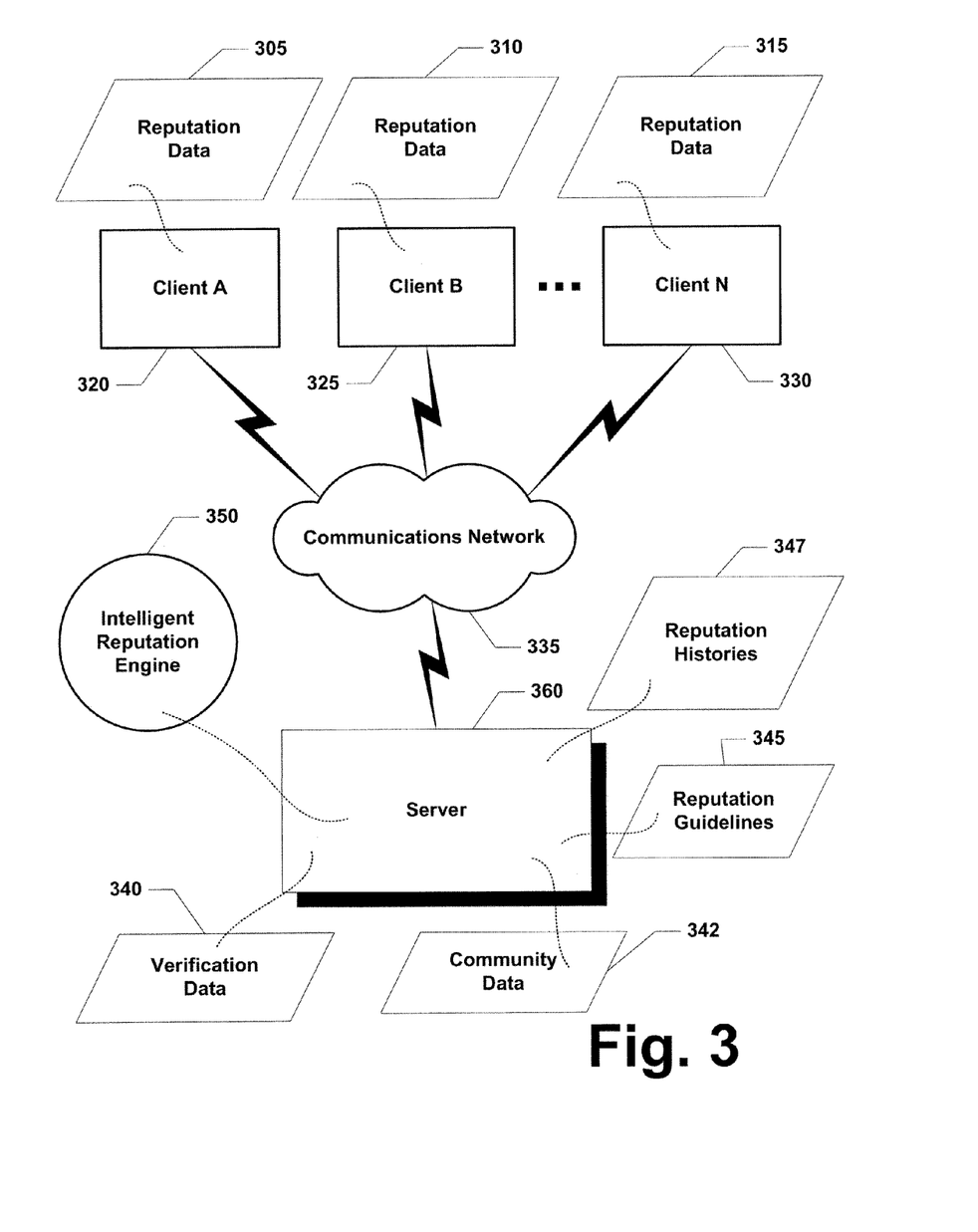
FIG. 3 is a block diagram showing an illustrative implementation of exemplary reputation attribution platform in accordance with some embodiments.

FIG. 3 is a block diagram showing an illustrative implementation of exemplary reputation attribution platform 300 in accordance with some embodiments. As shown in FIG. 3, exemplary reputation attribution platform 300 includes client computing environment 320, client computing environment 325 up to and including client computing environment 330, communications network 335, server computing environment 360, intelligent reputation engine 350, verification data 340, community data 342, reputation guidelines 345, and reputation histories data 347. Also, as shown in FIG. 3, reputation attribution platform 300 includes a plurality of reputation data (e.g., inputted and/or generated reputation data) 305, 310, and 315 which can be displayed, viewed, stored, electronically transmitted, navigated, manipulated, stored, and/or printed from client computing environments 320, 325, and 330, respectively.

In some embodiments, in an illustrative operation, client computing environments 320, 325, and 330 can communicate and cooperate with server computing environment 360 over communications network 335 to provide requests for and receive reputation data 305, 310, and 315. In the illustrative operation, intelligent reputation engine 350 can operate on server computing environment 360 to provide one or more instructions to server computing environment 360 to process requests for reputation data 305, 310, and 315 and to electronically communicate reputation data 305, 310, and 315 to the requesting client computing environment (e.g., client computing environment 320, client computing environment 325, or client computing environment 335). As part of processing requests for reputation data 305, 310, and 315, intelligent reputation engine 350 can utilize a plurality of data comprising verification date 340, community data 342, reputation guidelines 345, and/or reputation histories data 347. Also, as is shown in FIG. 3, client computing environments 320, 325, and 330 are capable of processing content production/sharing data 305, 310, and 315 for display and interaction to one or more participating users (not shown).

Figure 4:
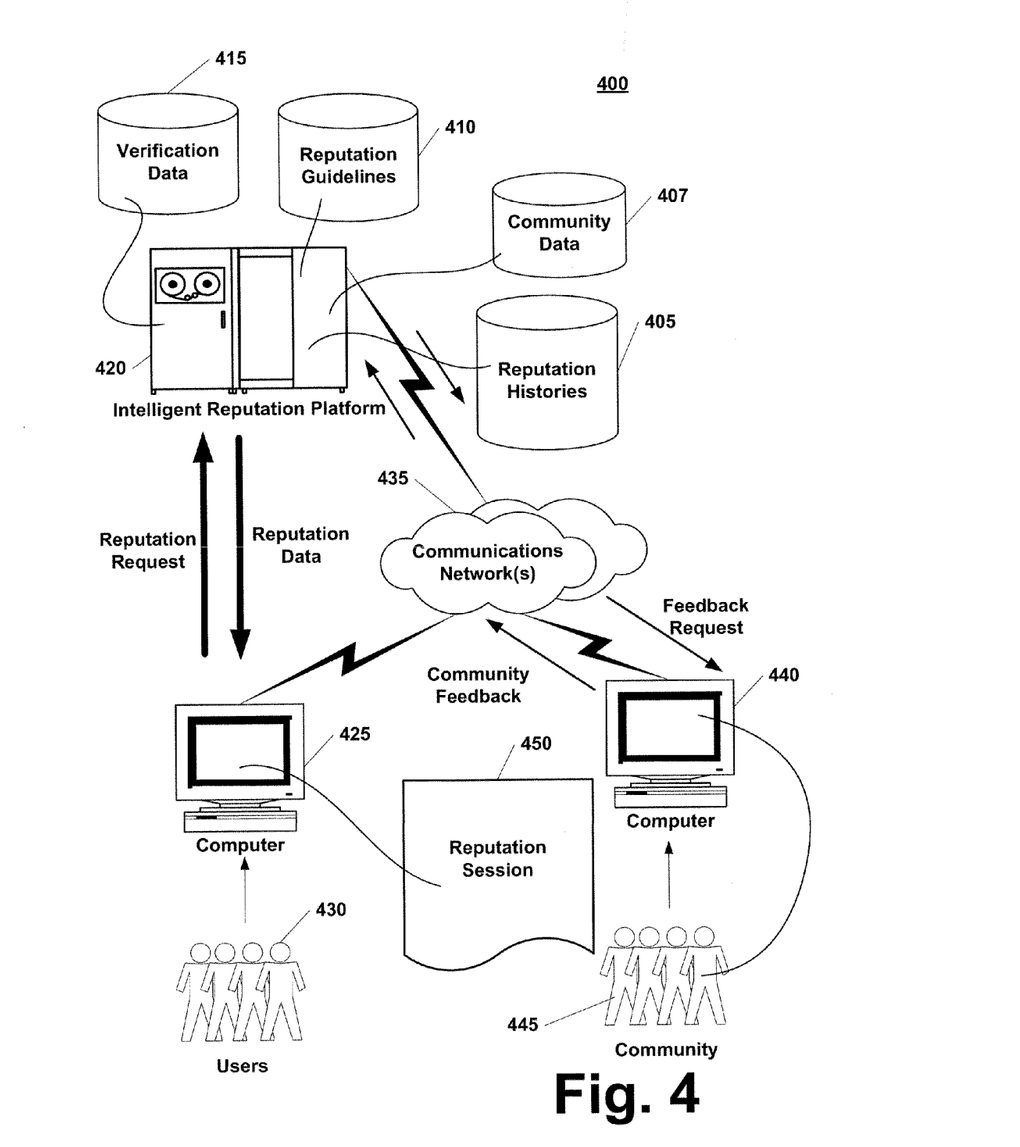
FIG. 4 is a block diagram showing a detailed illustrative implementation of exemplary reputation attribution environment in accordance with some embodiments.

FIG. 4 is a block diagram showing a detailed illustrative implementation of exemplary reputation attribution environment 400 in accordance with some embodiments. As shown in FIG. 4, exemplary reputation attribution environment 400 includes intelligent reputation platform 420, verification data store 415, reputation guidelines data store 410, reputation histories data store 405, and community data store 407, user computing environment 425, reputation targets (e.g., users) 430, community computing environment 440, and community 445. Additionally, as shown in FIG. 4, reputation attribution environment 400 includes reputation session content 450, which can be displayed, viewed, transmitted and/or printed from user computing environment 425 and/or community computing environment 440.

In some embodiments, in an illustrative implementation, intelligent reputation platform 420 can be electronically coupled to user computing environment 425 and community computing environment 440 via communications network 435. For example, in the illustrative implementation, communications network can include fixed-wire and/or wireless intranets, extranets, and the Internet.

In some embodiments, in an illustrative operation, users 430 interact with a reputation data interface (not shown) operating on user computing environment 425 to provide requests to initiate a reputation session that are passed across communications network 435 to intelligent reputation platform 420. In the illustrative operation, intelligent reputation platform 420 processes requests for a reputation session and cooperates with interactive verification data store 415, reputation guidelines data store 410, reputation histories data store 405, and community data store 407 to generate a reputation session for use by users 430 and community 445.

In some embodiments, in an illustrative implementation, verification data store 415 includes data representative of connections between users 430 and community members 445. For example, such data can include but is not limited to connections between users to identify a degree of association for use in generation of reputation data. In the illustrative implementation, reputation guideline data store 410 can include data representative of one or more rules for attributing reputations amongst users 330 and community 445. Reputation histories data store 405 can include one or more generated reputation attributions for use as part of reputation data processing. Community data store 407 can include data representative of community feedback for generated reputation data. For example, the data representative of connections can be provided through user input or generated from any number of methods including but not limited to automated or computer-assisted processing of data available on computer networks, links expressed or implied between entities on social networking websites, user commentary or "blogging" websites, or any other form of document available on the Internet.

Figure 5:
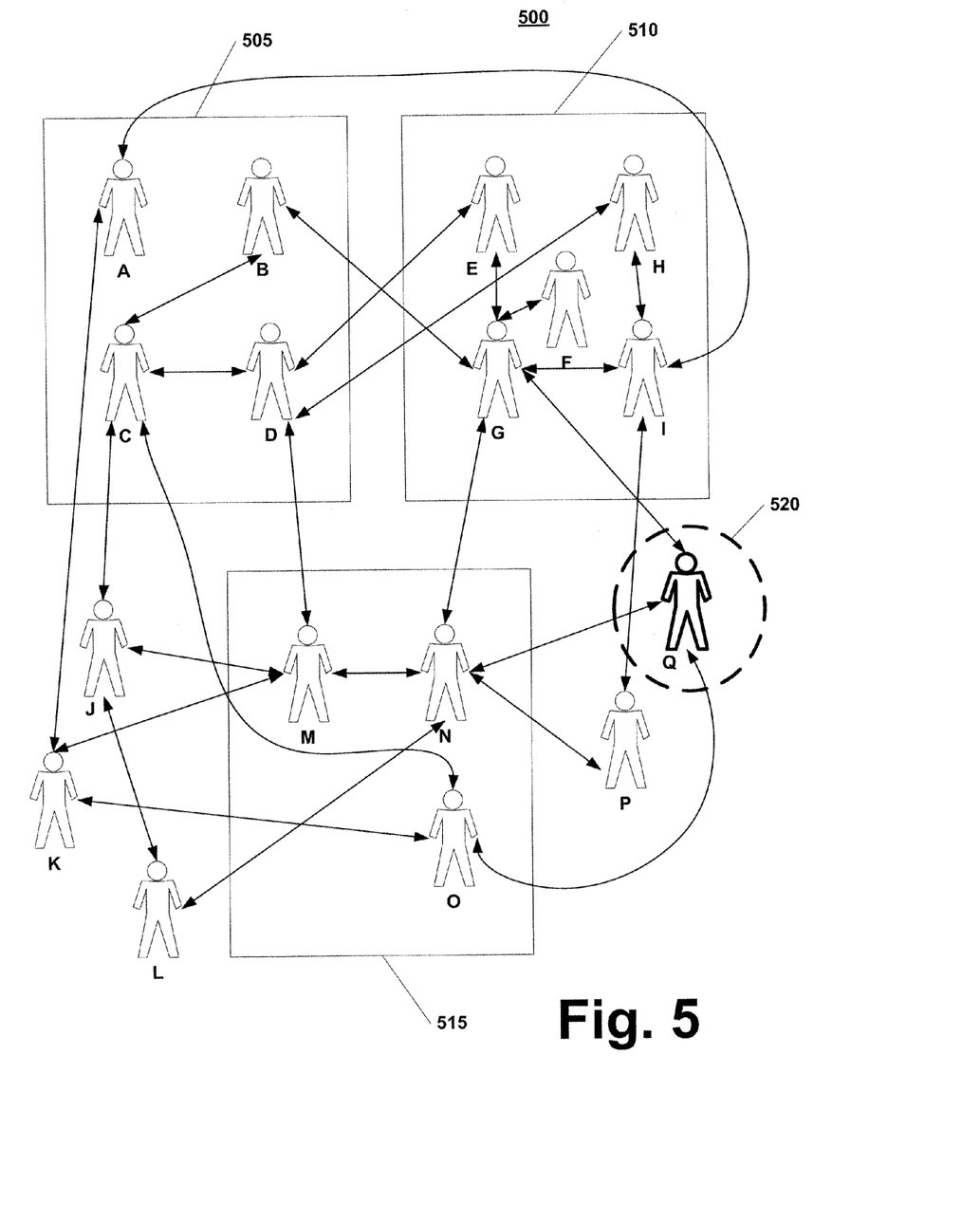
FIG. 5 is a block diagram describing the interaction of various parties of an exemplary referral environment in accordance with some embodiments.

FIG. 5 is a block diagram describing the interaction of various parties of an exemplary referral environment in accordance with some embodiments. In particular, FIG. 5 shows contributing elements of exemplary reputation attribution environment 500 in accordance with some embodiments. As shown, exemplary reputation attribution environment 500 includes a plurality of sub-environments 505, 510, and 515 and numerous reputation targets A-Q. As shown, reputation targets can have direct and/or indirect connections with other reputations targets within a given sub-environment 505, 510, or 515 and/or with other reputation targets that are outside sub-environments 505, 510, 515.

In an illustrative implementation, sub-environments 505, 510, or 515 can represent one or more facets of a reputation target's experience, such as work, home, school, club(s), and/or church/temple/commune. For example, in the illustrative implementation, an exemplary reputation target Q can inquire about the reputation of other reputation targets (e.g., obtain trusted data for use to assist in making a decision, determine an affinity, and/or identify a dislike). The individual reputations of each of the target participants can be derived according to the herein described techniques so that each reputation target is attributed one or more reputation indicators (e.g., a reputation score associated for restaurant referrals, another reputation score associated for movie referrals, another reputation score associated for match-making, etc.). For example, the reputation indicators can be calculated based on the degree and number of relationships between reputation targets in a given sub-environment and/or outside of a sub-environment. Once calculated, an exemplary reputation target Q can query other reputation targets for trusted data (e.g., recommendations and/or referrals) and can process such trusted data according to reputation score of the data source (e.g., reputation target).

For example, sub-environment 505 can represent a place of business, sub-environment 510 can represent home, and sub-environment can represent a country club. In some embodiments, in an illustrative operation, each of the reputation targets of reputation attribution environment 500 can be attributed one or more reputation scores (e.g., reputation score for business data, reputation score for family data, etc.). In the illustrative operation, the reputation score for each reputation target for each category (e.g., business, family, social, religious, etc.) can be calculated according to the degree of relationship with other reputation targets and/or the number of connections with other relationship targets.

In some embodiments, in the illustrative operation, reputation target Q can request data regarding a business problem (e.g., how to broker a transaction). Responsive to the request, the reputation targets of sub-environment 505 (e.g., reputation target can act as data sources for reputation target Q) providing data which can satisfy reputation target Q's request. Additionally, other reputation targets, who are not directly part of sub-environment 505, can also act as data sources to reputation target Q. In this context, the reputation score for reputation targets A, B, C, and/or D) can have a higher reputation score than other reputation targets not part of sub-environment 505 as such reputation targets are within sub-environment 505, which is focused on business. In the illustrative operation, other reputation targets not part of sub-environment 505 can have equal or near level reputation scores to reputation targets (A, B, C, and/or D) of sub-environment 505 based on the connections with reputation targets A, B, C, and/or D and reputation target Q. For example, as shown in FIG. 5, reputation target I can have a relatively high reputation score as it pertains to business as reputation target I has a number of direct and indirect connections (I-A, I-G-B, I-H-D, I-G-E-D) to reputation targets (e.g., A, B, C, and/or D) of sub-environment 505 and to inquiring reputation target Q.

It is appreciated that although exemplary reputation attribution environment 500 of FIG. 5 is shown with a configuration of sub-environments having various participants, that such description is merely illustrative of the contemplated reputation attribution environment of the herein described techniques, which can have numerous sub-environments with various participants in various other configurations.

Figure 6:
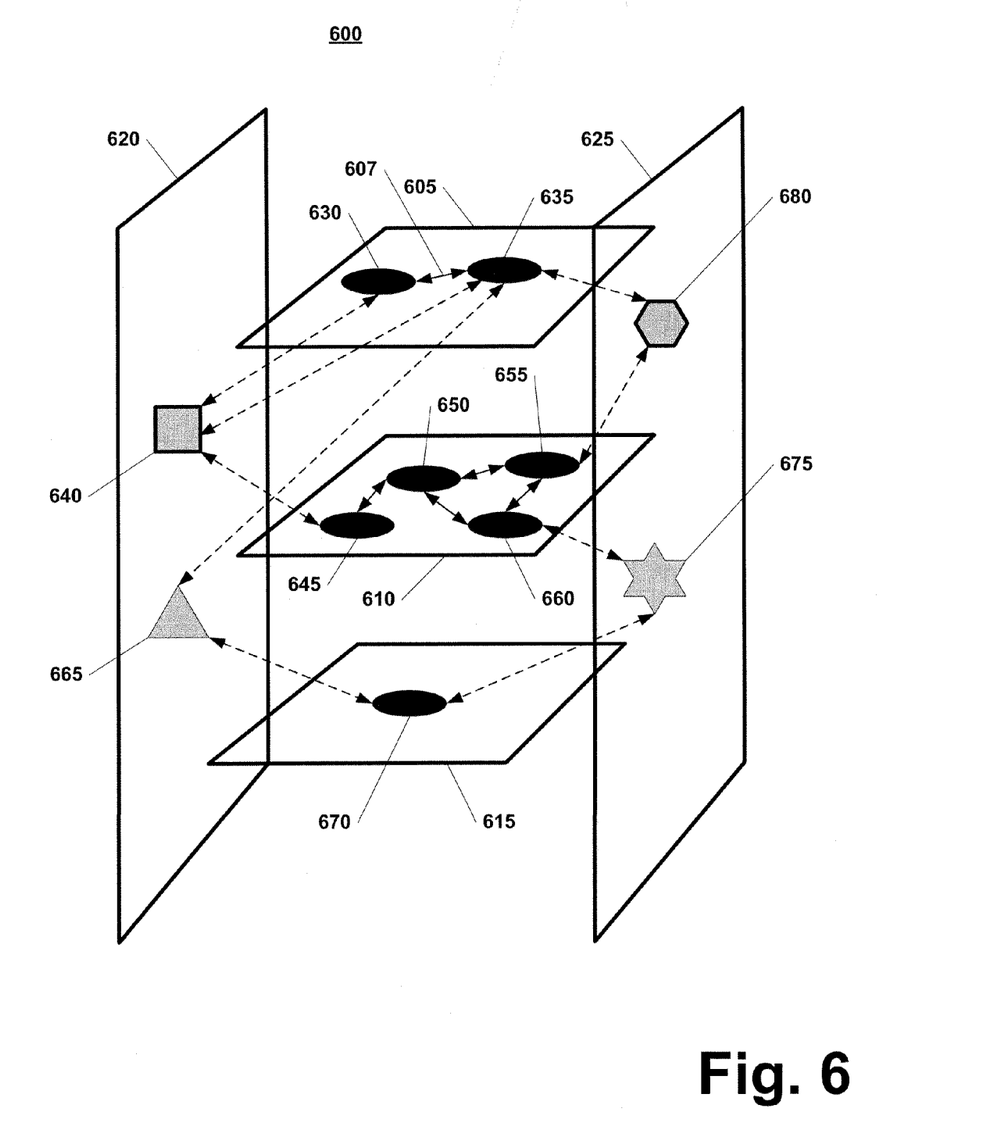
FIG. 6 is a block diagram of the search space of an exemplary reputation scoring environment in accordance with some embodiments.

FIG. 6 is a block diagram of the search space of an exemplary reputation scoring environment in accordance with some embodiments. In particular, FIG. 6 shows exemplary reputation scoring environment 600 in accordance with some embodiments. As shown in FIG. 6, reputation scoring environment 600 includes a plurality of dimensions 605, 610, and 615, which are operatively coupled to one or more transitive dimensions 620 and 625. Further, as shown, reputation scoring environment 600 includes one or more entities 630, 635, 645, 650, 660, and 670 residing on one or more of dimensions 605, 610, and 615 as well as transitive connectors 640, 665, 670, and 680 residing on transitive dimensions 620 and 625.

In some embodiments, in an illustrative operation, scores for one or more entities 630, 635, 645, 650, 660 and/or 670 can be determined on a network (not shown) on a given dimension 605, 610 and/or 615. In the illustrative operation, an entity 630, 635, 645, 650, 660 and/or 670 can be directly linked to any number of other entities 630, 635, 645, 650, 660 and/or 670 on any number of dimensions 605, 610, and/or 615 (e.g., such that each link—direct/indirect can be associated with a score). For example, one or more dimension 605, 610, and/or 615 can have an associated one or more transitive dimension 620 and/or 625.

In some embodiments, in the illustrative operation, a directed path 607 on a given dimension 605 between two entities 630 and 635, such as a source and a target, includes a directed link from the source entity 630 (e.g., illustratively 630 as all entities 630, 635, 645, 650, 660, and/or 670 can be source and/or target entities depending on the perspective of the scoring attribution platform as described herein in accordance with various embodiments) to an intermediate entity 640, prefixed to a directed path from the intermediate entity 640 to the target entity 635.

In some embodiments, in an illustrative implementation, links on the path can be on one or more transitive dimensions 620 and/or 625 associated with a given dimension 605, 610, and/or 615. Illustratively, to determine a score on a given dimension 605, 610, and/or 615 between a source entity 630 and a target entity 635, directed paths 607 on the given dimension 605, 610, and/or 615 are determined through any kind of graph search (not shown). In the illustrative operation, the individual scores on the one or more links on the one or more paths can be combined to produce one or more resulting scores with a one or more available techniques for propagating scores and generally available techniques for resolving conflicts between different scores. Illustratively, one or more intermediate entities 640, 665, 670, and/or 680 can also be provided with a measure of influence on the dimensions 605, 610 and/or 615 based on the universe of source entities (e.g., 630, 635, 645, 650, 660, 670), the universe of target entities (630, 635, 645, 650, 660, 670) and the links between them.

It is appreciated that although reputation scoring environment 600 is shown to have a particular configuration operating to an illustrative operation with a particular number of dimensions, transitive dimensions, entities, direct connections and indirect connections that such description is merely illustrative as the influence calculation within the herein described embodiments can employ various dimensions, transitive dimensions, entities, direct, and/or indirect connections having various configurations and assemblages operating according to other illustrative operations.

Figure 7:
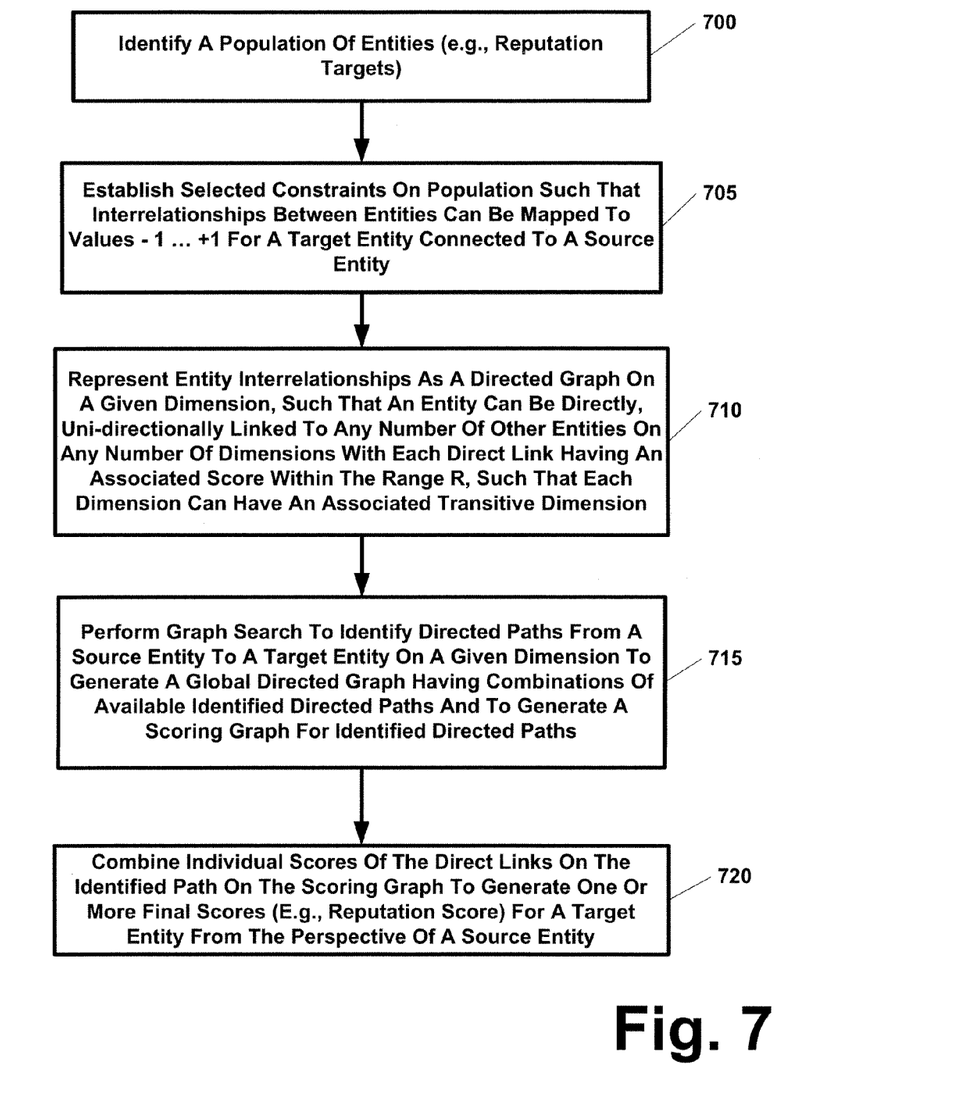
FIG. 7 is a flow diagram showing illustrative processing performed in generating referrals in accordance with some embodiments.

FIG. 7 is a flow diagram showing illustrative processing performed in generating referrals in accordance with some embodiments. In particular, FIG. 7 shows exemplary processing in calculating reputations scores. As shown in FIG. 7, processing begins at block 700 at which a population of entities are identified. Processing then proceeds to block 705 at which selected constraints are established on the identified population such that the interrelationships between the entities can be mapped to values −1 to +1 for a target entity connected to source entity. Processing then proceeds to block 710 at which entity relationships are represented as a directed graph on a given dimension such that an entity can be directly, uni-directionally linked to any number of other entities on any number of dimensions with each direct link having an associated score within a selected range R such that each dimension can have therewith an associated transitive dimension. Processing then proceeds to block 715 at which a graph search is performed to identify directed paths from a source entity to a target entity on a given dimension to generate a global directed graph having combinations of available identified directed paths and to generate a scoring graph for identified directed paths. Processing then proceeds to block 720 at which individual scores of the direct links on an identified path can be combined to generate one or more final scores (e.g., reputation score) for a target entity from the perspective of a source entity.

In some embodiments, in an illustrative implementation, the processing of FIG. 7 can be performed such that for a population of entities, a method of determining scores, each within the range R which can be mapped to the values −1 . . . +1, for a target entity connected to a source entity on a network that can be conceptually represented as a directed graph on each given dimension, such that an entity can be directly, uni-directionally linked to any number of other entities on any number of dimensions, with each direct link having an associated score within the range R. Further, each dimension can have an associated transitive dimension and such that a directed path on a given dimension between two entities, a source entity and a target entity, can be defined as a direct link from the source entity to an intermediate entity, prefixed to a directed path from the intermediate entity to the target entity, subject to the selected constraints including but not limited to: 1) a direct link from any entity to the target entity must be on the given dimension, and 2) a direct link on the path from any entity to an intermediate entity that is not the target entity must be either on the transitive dimension associated with the given dimension, or on the given dimension itself if the given dimension is itself is a transitive dimension.

In some embodiments, in the illustrative operation, the processing of FIG. 7 can include but is not limited to: (A) performing a graph search (e.g., using generally available graph search techniques) to identify directed paths from a source entity to a target entity on a given dimension subject to the above definition of a directed path, which optimally results in a directed graph combining all such identified directed paths. For example, the resulting directed graph can be defined as a scoring graph that can be stored separately. In the illustrative operation, individual scores can be combined (B) on each direct link on each path on the scoring graph to produce one or more final scores, with or without an associated set of confidence values in the range C=0 . . . 1 for each resulting score, for the target entity from the perspective of the source entity. For example, in the illustrative operation, the acts (A) and (B) can be performed in sequence, or performed simultaneously; when performed simultaneously, the combination of individual scores described in act (B) being performed during the graph search described in act (A) without the creation of separately stored scoring graph; and in which the graph search performed in act (A) can be optimized by some combination of scores identified through act (B) such that the optimization may result in the exclusion of certain paths between the source entity and the target entity.

In some embodiments, in an illustrative operation of the herein described techniques, the influence of each entity is estimated as the count of other entities with direct links to the entity or with a path, possibly with a predefined maximum length, to the entity; with or without the count being adjusted by the possible weights on each link, the length of each path, and the level of each entity on each path.

In some embodiments, in an illustrative operation of the herein described techniques, the influence of each entity is estimated with the adjusted count calculated through the operations described herein (e.g., estimated as the count of other entities with direct links to the entity or with a path, possibly with a predefined maximum length, to the entity; with or without the count being adjusted by the possible weights on each link, the length of each path, and the level of each entity on each path), transformed into a rank or percentile relative to the similarly measured influence of all other entities.

In some embodiments, in an illustrative operation of the herein described techniques, the influence of each entity is estimated as the count of actual requests for data, opinion, or searches relating to or originating from other entities, entities with direct links to the entity or with a path, possibly with a predefined maximum length, to the entity; such actual requests being counted if they result in the use of the paths originating from the entity (e.g., representing opinions, reviews, citations or other forms of expression) with or without the count being adjusted by the possible weights on each link, the length of each path, and the level of each entity on each path.

In some embodiments, in an illustrative operation of the herein described techniques, the influence of each entity is estimated with the adjusted count calculated through the operations described herein, transformed into a rank or percentile relative to the similarly measured influence of all other entities.

In some embodiments, in an illustrative operation of the herein described techniques, the influence of each entity is estimated as the count of actual requests for data, opinion, or searches relating to or originating from other entities, entities with direct links to the entity or with a path, possibly with a predefined maximum length, to the entity; such actual requests being counted if they occur within a predefined period of time and result in the use of the paths originating from the entity (e.g., representing opinions, reviews, citations or other forms of expression) with or without the count being adjusted by the possible weights on each link, the length of each path, and the level of each entity on each path.

In some embodiments, in an illustrative operation of the herein described techniques, the influence of each entity is estimated with the adjusted count calculated through the operations described herein, transformed into a rank or percentile relative to the similarly measured influence of all other entities.

In some embodiments, in an illustrative operation of the herein described techniques, the influence of each entity is estimated by applying to it any of several graph metric functions, such as centrality or betweenness, in which the functions, such as centrality or betweenness, is estimated either by relating the entity to the entire graph including all linked entities, or by relating the entity to a subgraph comprising all entities linked to the entities directly or by paths of up to a given length. In some embodiments, determining the objective influence measure is performed using one or more of the following functions: any form of graph centrality, including betweenness centrality, degree centrality, closeness centrality, eigenvector centrality, flow centrality; including where such functions are applied using additional weightings on each edge of the graph additional to any existing edge weights, such additional weightings being functions of a the use of each edge in order to serve actual requests for data, opinion, or searches relating to or originating from other entities.

In some embodiments, the illustrative operations described herein for the calculation of influence is performed for each dimension separately, resulting in one influence measure for each entity for each dimension; for all dimensions together, resulting in one influence measure for each entity; or for any given subgroup of dimensions together applied to any given entity, resulting in each entity having as many influence measures as the number of subgroups of dimensions applied to that entity.

In some embodiments, in an illustrative operation of the herein described techniques, the influence of each entity as estimated in each of the operations described herein, is adjusted by metrics relating to the graph comprising all entities or a subset of all linked entities. For example, such metrics can include the density of the graph, defined as the ratio of the number of links to the number of linked entities in the graph; such metrics are transformed by mathematical functions optimal to the topology of the graph, such as where it is known that the distribution of links among entities in a given graph may be non-linear. An example of such an adjustment would be the operation of estimating the influence of an entity as the number of directed links connecting to the entity, divided by the logarithm of the density of the graph comprising all linked entities. For example, such an operation can provide an optimal method of estimating influence rapidly with a limited degree of computational complexity.

In some embodiments, in an illustrative operation of the herein described techniques, in which the influence of entities as estimated in each of the operations described herein is estimated for separate, unconnected graphs; and where such influence estimated for entities in separate, unconnected graphs is adjusted by applying metrics relating to each separate unconnected graph in its entirety, as shown in the operations described herein; the influence of each entity on one graph, thus adjusted, is normalized and compared to the influence of another entity on another graph, also thus adjusted. For example, such an operation allows for the use of influence measures across separate, unconnected graphs.

In some embodiments, in an illustrative operation of the herein described techniques, the estimation of influence is optimized for different contexts and requirements of performance, memory, graph topology, number of entities, and/or any other context and/or requirement, by any combination of the operations described above in paragraphs above, and any similar operations involving metrics including but not limited to values comprising: the number of potential source entities to the entity for which influence is to be estimated, the number of potential target entities, the number of potential directed paths between any one entity and any other entity on any or all given dimensions, the number of potential directed paths that include the entity, the number of times within a defined period that a directed link from the entity is used for a scoring, search or other operation(s).

It is understood that the herein described techniques are susceptible to various modifications and alternative embodiments. There is no intention to limit the herein described techniques to the specific embodiments described herein. On the contrary, the herein described techniques are intended to cover all modifications, alternative embodiments, and equivalents falling within the scope and spirit of the herein described techniques.

It should also be noted that the herein described techniques can be implemented in a variety of electronic environments (including both non-wireless and wireless computer environments, including cell phones and video phones), partial computing environments, and real world environments. For example, the various techniques described herein can be implemented in hardware or software, or a combination of both. In some embodiments, the techniques are implemented in computing environments maintaining programmable computers that include a computer network, processor, servers, a storage medium readable by the processor (e.g., including volatile and non-volatile memory and/or storage elements), at least one input device, and at least one output device. In some embodiments, computing hardware logic cooperating with various instructions sets are applied to data to perform the functions described herein and to generate output information. The output information is applied to one or more output devices. For example, programs used by the exemplary computing hardware can be implemented in various programming languages, including high level procedural or object oriented programming language to communicate with a computer system. As another example, the herein described techniques can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. For example, the apparatus can also be considered to be implemented as a computer-readable storage medium, configured with a computer program, in which the storage medium so configured causes a computer to operate in a specific and predefined manner.

Although exemplary implementations of the herein described techniques have been described in detail above, those skilled in the art will readily appreciate that many additional modifications are possible in the exemplary embodiments without materially departing from the novel teachings and advantages of the herein described techniques. Accordingly, these and all such modifications are intended to be included within the scope of the herein described techniques.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method, comprising:
   receiving a subject graph, wherein the subject graph includes two or more subject nodes, and wherein each subject node corresponds to a subject; and
   determining an objective influence measure based on the subject graph for each first subject node of the subject graph, wherein the determination is based at least on part on a function of inward scores and outward scores, wherein inward scores are computed from one or more paths leading to the first subject of a length of at least one, and wherein outward scores are computed from one or more paths leading from the first subject of a length of at least one, wherein the computation of objective influence measure for the first subject node performed using the inward scores and the outward scores is a minimum-spend eigenvector centrality of the first subject node, wherein the minimum-spend eigenvector centrality is determined by an iterative computation of eigenvector centrality.

2. The method recited in claim 1, wherein the subject graph is a directed graph, or if the subject graph is an undirected graph, then each undirected edge is interpreted as two directed edges in opposite directions.

3. The method recited in claim 1, wherein the subject graph is a weighted graph, or if the subject graph is an unweighted graph, then each unweighted edge is interpreted as a weighted edge of a constant weight, and wherein the said constant weight can be any value including zero.

4. The method recited in claim 1, wherein a path is a sequence of contiguous edges with a length equal to its number of edges, wherein at least one of the inward paths or outward paths is of length greater than one.

5. The method recited in claim 1, wherein the inward scores are based on the count and weights of one or more paths leading to the first subject of a length of at least one.

6. The method recited in claim 1, wherein the outward scores are based on the count and weights of one or more paths leading from the first subject of a length of at least one.

7. The method recited in claim 1, wherein the inward scores are based on a count of one or more paths leading to the first subject of a length of at least one.

8. The method recited in claim 1, wherein the outward scores are based on a count of one or more paths leading from the first subject of a length of at least one.

9. The method recited in claim 1, wherein the objective influence measure is determined for all paths of the subject graph.

10. The method recited in claim 1, wherein the objective influence measure is determined as a function of a count of actual requests for data, opinion, or searches relating to or originating from other entities.

11. The method recited in claim 1, wherein the determining the objective influence measure is performed using one or more of the following functions: any form of graph centrality, including betweenness centrality, degree centrality, closeness centrality, eigenvector centrality, flow centrality; including wherein such functions are applied using additional weightings on each edge of the graph additional to any existing edge weights, such additional weightings being functions of a the use of each edge in order to serve actual requests for data, opinion, or searches relating to or originating from other entities.

12. The method recited in claim 1, further comprising:
    determining whether a first entity is a subject or an object;
    determining whether a second entity is a subject or an object; and
    generating a graph, wherein a subset of the graph is the subject graph of subject nodes that includes at least one or more subject entities linked to one or more other subject entities, and wherein the graph includes one or more object entities each linked to one or more subject entities in the subject graph.

13. The method recited in claim 1, further comprising:
    generating a graph, wherein a subset of the graph is the subject graph of subject nodes that includes at least one or more subject entities linked to one or more other subject entities, and wherein the graph includes one or more object entities each linked to one or more subject entities in the subject graph.

14. The method recited in claim 1,
    generating the subject graph of subject nodes that includes at least one or more subject entities linked to one or more other subject entities.

15. The method recited in claim 1, wherein the first subject corresponds to one or more of the following: representations of a person, web log, and entities representing Internet authors or users of social media services including is one or more of the following: blogs, Twitter, or reviews on Internet web sites.

16. The method recited in claim 1, wherein the computation of the objective influence measure for the first subject node performed using the inward scores and the outward scores is a measure of eigenvector centrality of the first subject node.

17. The method recited in claim 1, wherein object nodes correspond to one or more of the following: books, films, music, documents, websites, objects for sale, objects that are reviewed or recommended or cited, or any entities that are or can be associated with a Uniform Resource Identifier (URI).

18. The method recited in claim 1, wherein the objective influence measure of each first subject node is transformed into a rank or percentile relative to the objective influence measure of a plurality of other entities represented in the subject graph.

19. A computer-implemented method, comprising:
    receiving a subject graph, wherein the subject graph includes two or more subject nodes, and wherein each subject node corresponds to a subject; and
    determining an objective influence measure based on the subject graph for each first subject node of the subject graph, wherein the determination is based at least on part on a function of inward scores and outward scores, wherein inward scores are computed from one or more paths leading to the first subject of a length of at least one, and wherein outward scores are computed from one or more paths leading from the first subject of a length of at least one,
    wherein the computation of objective influence measure for the first subject node performed using the inward scores and the outward scores is a minimum-spend eigenvector centrality of the first subject node, wherein the minimum-spend eigenvector centrality is determined by an iterative computation of eigenvector centrality, wherein at each iteration for each node a minimum outdegree is assumed if the actual outdegree falls below the minimum outdegree, such minimum outdegree being computed as a non-linear function of the minimum spend eigenvector centrality of the first subject node from the previous iteration.

20. A computer-implemented method, comprising:
    receiving a subject graph, wherein the subject graph includes two or more subject nodes, and wherein each subject node corresponds to a subject; and determining an objective influence measure based on the subject graph for each first subject node of the subject graph, wherein the determination is based at least on part on a function of inward scores and outward scores, wherein inward scores are computed from one or more paths leading to the first subject of a length of at least one, and wherein outward scores are computed from one or more paths leading from the first subject of a length of at least one, wherein the computation of the objective influence measure for the first subject node performed using the inward scores and the outward scores is a minimum-spend eigenvector centrality of the first subject node, wherein the minimum-spend eigenvector centrality is determined by an iterative computation of eigenvector centrality, and wherein at each iteration for each node a minimum outdegree is assumed if the actual outdegree falls below the minimum outdegree, such minimum outdegree being computed as a generated non-linear function of the minimum spend eigenvector centrality of the first subject node from the previous iteration and the generated non-linear function is generated from the distribution of the actual indegrees and outdegrees of a plurality of nodes.

21. A computer-implemented method, comprising:

receiving a subject graph, wherein the subject graph includes two or more subject nodes, and wherein each subject node corresponds to a subject; and determining an objective influence measure based on the subject graph for each first subject node of the subject graph, wherein the determination is based at least on part on a function of inward scores and outward scores, wherein inward scores are computed from one or more paths leading to the first subject of a length of at least one, and wherein outward scores are computed from one or more paths leading from the first subject of a length of at least one, and computing a citation-weighted minimum spend eigenvector centrality or a citation-weighted ordinary eigenvector centrality as a function of the minimum-spend eigenvector centrality or ordinary eigenvector centrality, respectively, and the number of citations made by the first subject node, wherein the number of citations made by the first subject node is determined based on a number of outgoing links from the first subject node to each of the object nodes.

22. A computer-implemented system comprising:

a processor configured to:

receive a subject graph, wherein the subject graph includes two or more subject nodes, wherein each subject node corresponds to a subject, and wherein the subject graph is a directed graph, or if the subject graph is an undirected graph, then each undirected edge is interpreted as two directed edges in opposite directions; and determine an objective influence measure based on the subject graph for each first subject node of the subject graph, wherein the determination is based at least on part on a function of inward scores and outward scores, wherein inward scores are based on a count of one or more paths leading to the first subject of a length of at least one, and wherein outward scores are based on a count of one or more paths leading from the first subject of a length of at least one, wherein the computation of objective influence measure for the first subject node performed using the inward scores and the outward scores is a minimum-spend eigenvector centrality of the first subject node, wherein the minimum-spend eigenvector centrality is determined by an iterative computation of eigenvector centrality; and a memory coupled to the processor and configured to provide the processor with instructions.

23. The system recited in claim 22, wherein a path is a sequence of contiguous edges with a length equal to its number of edges, wherein at least one of the inward paths or outward paths is of length greater than one, wherein the inward scores are based on the count and weights of one or more paths leading to the first subject of a length of at least one, and wherein the outward scores are based on the count and weights of one or more paths leading from the first subject of a length of at least one.

24. A computer program product, the computer program product being embodied in a computer readable storage medium and comprising computer instructions for:

receiving a subject graph, wherein the subject graph includes two or more subject nodes, wherein each subject node corresponds to a subject, and wherein the subject graph is a directed graph, or if the subject graph is an undirected graph, then each undirected edge is interpreted as two directed edges in opposite directions; and determining an objective influence measure based on the subject graph for each first subject node of the subject graph, wherein the determination is based at least on part on a function of inward scores and outward scores, wherein inward scores are based on a count of one or more paths leading to the first subject of a length of at least one, wherein outward scores are based on a count of one or more paths leading from the first subject of a length of at least one, wherein a path is a sequence of contiguous edges with a length equal to its number of edges, wherein at least one of the inward paths or outward paths is of length greater than one, wherein the inward scores are based on the count and weights of one or more paths leading to the first subject of a length of at least one, and wherein the outward scores are based on the count and weights of one or more paths leading from the first subject of a length of at least one, wherein the computation of objective influence measure for the first subject node performed using the inward scores and the outward scores is a minimum-spend eigenvector centrality of the first subject node, wherein the minimum-spend eigenvector centrality is determined by an iterative computation of eigenvector centrality.

* * * * *